(12) United States Patent
Shimamoto et al.

(10) Patent No.: US 11,586,224 B2
(45) Date of Patent: Feb. 21, 2023

(54) VEHICLE CONTROL APPARATUS, VEHICLE, OPERATION METHOD FOR VEHICLE CONTROL APPARATUS, AND STORAGE MEDIUM

(71) Applicant: HONDA MOTOR CO., LTD., Tokyo (JP)

(72) Inventors: Gaku Shimamoto, Wako (JP); Junpei Noguchi, Wako (JP); Naotoshi Takemura, Wako (JP); Hidetoshi Kobori, Wako (JP); Masafumi Sagara, Wako (JP); Tatsuro Fujiwara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 191 days.

(21) Appl. No.: 17/099,901

(22) Filed: Nov. 17, 2020

(65) Prior Publication Data
US 2021/0157335 A1 May 27, 2021

(30) Foreign Application Priority Data
Nov. 21, 2019 (JP) .............................. JP2019-210602

(51) Int. Cl.
*G06T 7/00* (2017.01)
*G05D 1/03* (2006.01)
(Continued)

(52) U.S. Cl.
CPC ............. *G05D 1/03* (2013.01); *G05D 1/0242* (2013.01); *G06T 7/70* (2017.01); *G06T 2207/10016* (2013.01); *G06T 2207/30252* (2013.01)

(58) Field of Classification Search
CPC .......... G05D 1/03; G05D 1/0242; G06T 7/70; G06T 2207/10016; G06T 2207/30252
(Continued)

(56) References Cited

U.S. PATENT DOCUMENTS 10,005,458 B2   6/2018 Ohshima
10,019,001 B2   7/2018 Dang Van Nhan
(Continued)

FOREIGN PATENT DOCUMENTS

JP   2007-295033 A   11/2007
JP   2008-015839 A    1/2008
(Continued)

OTHER PUBLICATIONS

Japanese Office Action (with partial translation) for Japanese Patent Application No. 2019-210602 dated Oct. 1, 2021.

*Primary Examiner* — Tyler J Lee
*Assistant Examiner* — Tiffany P Ohman
(74) *Attorney, Agent, or Firm* — Thomas | Horstemeyer, LLP

(57) ABSTRACT

A vehicle control apparatus that controls movement of a vehicle in response to an instruction from a remote control terminal located outside the vehicle, the apparatus comprising: an obtaining unit configured to obtain an image captured by an image capturing unit configured to capture an image of a periphery of the vehicle; an operator detecting unit configured to detect an operator of the remote control terminal on the basis of the image obtained by the obtaining unit; a terminal detecting unit configured to detect a position of the remote control terminal relative to the vehicle; and a control unit configured to control, on the basis of a detection result from the operator detecting unit and a detection result from the terminal detecting unit, whether to permit or
(Continued)

prohibit a remote control operation of the vehicle performed through the remote control terminal.

12 Claims, 6 Drawing Sheets

(51) Int. Cl.
  *G05D 1/02* (2020.01)
  *G06T 7/70* (2017.01)
(58) Field of Classification Search
  USPC .............................................................. 701/2
  See application file for complete search history.

(56) References Cited

U.S. PATENT DOCUMENTS

| | | | |
|---|---|---|---|
| 10,625,734 | B2 | 4/2020 | Ohshima |
| 2014/0058587 | A1* | 2/2014 | Leinfelder ......... B62D 15/0285 |
| | | | 701/2 |
| 2016/0144857 | A1 | 5/2016 | Ohshima |
| 2017/0168479 | A1 | 6/2017 | Dang Van Nhan |
| 2018/0170367 | A1 | 6/2018 | Ohshima |
| 2018/0290627 | A1* | 10/2018 | Hariri .................. B60R 25/245 |
| 2019/0382010 | A1* | 12/2019 | Woodley ............. B60W 30/146 |
| 2021/0295550 | A1* | 9/2021 | Wakita ...................... G06T 7/70 |

FOREIGN PATENT DOCUMENTS

| | | |
|---|---|---|
| JP | 2014-220775 A | 11/2014 |
| JP | 2016-099953 A | 5/2016 |
| JP | 2016-173652 A | 9/2016 |
| JP | 2017517903 A | 6/2017 |
| JP | 2019-196065 A | 11/2019 |
| WO | 2015114269 A1 | 8/2015 |

\* cited by examiner

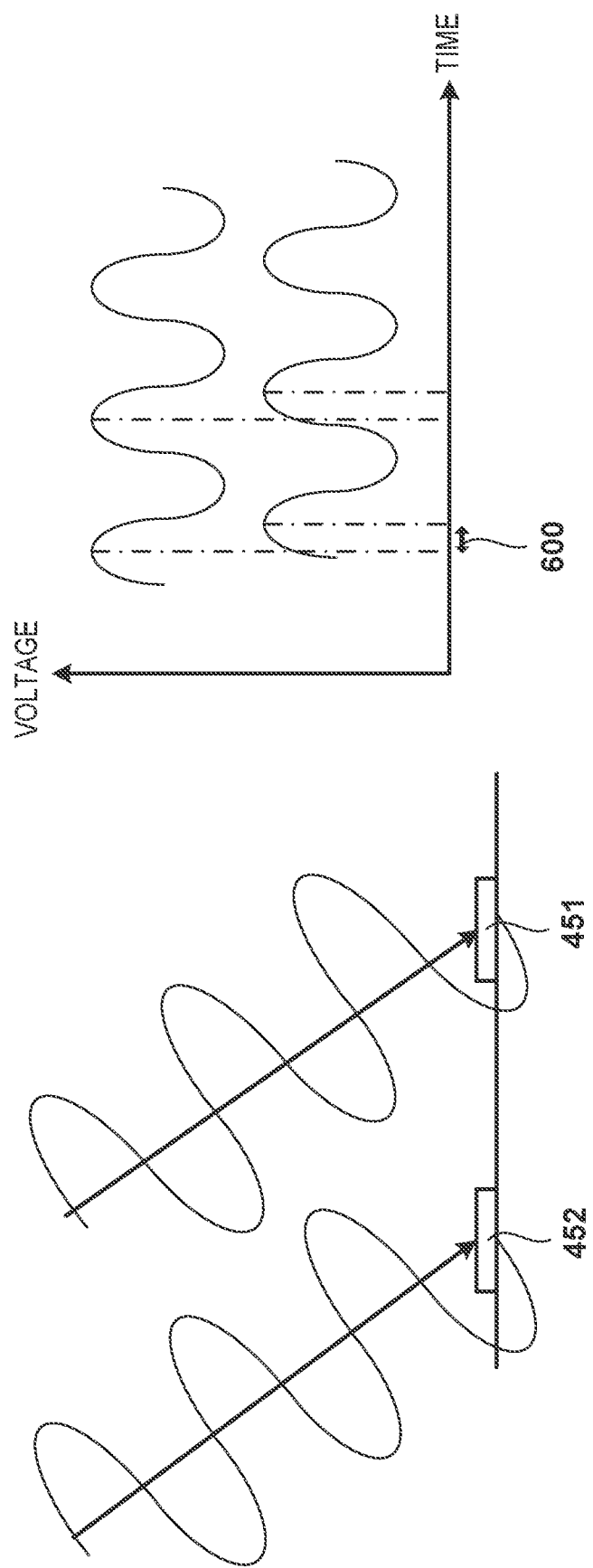

VEHICLE CONTROL APPARATUS, VEHICLE, OPERATION METHOD FOR VEHICLE CONTROL APPARATUS, AND STORAGE MEDIUM

CROSS-REFERENCE TO RELATED APPLICATION

This application claims priority to and the benefit of Japanese Patent Application No. 2019-210602 filed on Nov. 21, 2019, the entire disclosure of which is incorporated herein by reference.

BACKGROUND OF THE INVENTION

Field of the Invention

The present invention relates to a vehicle control apparatus, a vehicle, an operation method for a vehicle control apparatus, and a storage medium.

Description of the Related Art

Japanese Patent Laid-Open No. 2017-517903 discloses using an operating terminal outside a vehicle to remotely initiate autonomous movement of the vehicle from an initial position to a final position for the purpose of parking.

An operator who is driving a vehicle remotely using an operation terminal in this manner is obligated to monitor the vehicle surroundings in the same manner as when driving normally, and thus it is conceivable to use the operating terminal or the like to prompt the operator to monitor the vehicle surroundings.

However, there is an issue in that even if the operator is prompted to monitor the surroundings in the operating terminal or the like, they may nevertheless execute the remote control without actually monitoring the surroundings.

The present invention provides a technique for improving the safety of remote control of a vehicle.

SUMMARY OF THE INVENTION

According to one aspect of the present invention, there is provided a vehicle control apparatus that controls movement of a vehicle in response to an instruction from a remote control terminal located outside the vehicle, the apparatus comprising: an obtaining unit configured to obtain an image captured by an image capturing unit configured to capture an image of a periphery of the vehicle; an operator detecting unit configured to detect an operator of the remote control terminal on the basis of the image obtained by the obtaining unit; a terminal detecting unit configured to detect a position of the remote control terminal relative to the vehicle; and a control unit configured to control, on the basis of a detection result from the operator detecting unit and a detection result from the terminal detecting unit, whether to permit or prohibit a remote control operation of the vehicle performed through the remote control terminal.

BRIEF DESCRIPTION OF THE DRAWINGS

FIGS. 6A and 6B are diagrams illustrating an example of a method for detecting a position of an operating terminal according to an embodiment.

DESCRIPTION OF THE EMBODIMENTS

Figure 1:
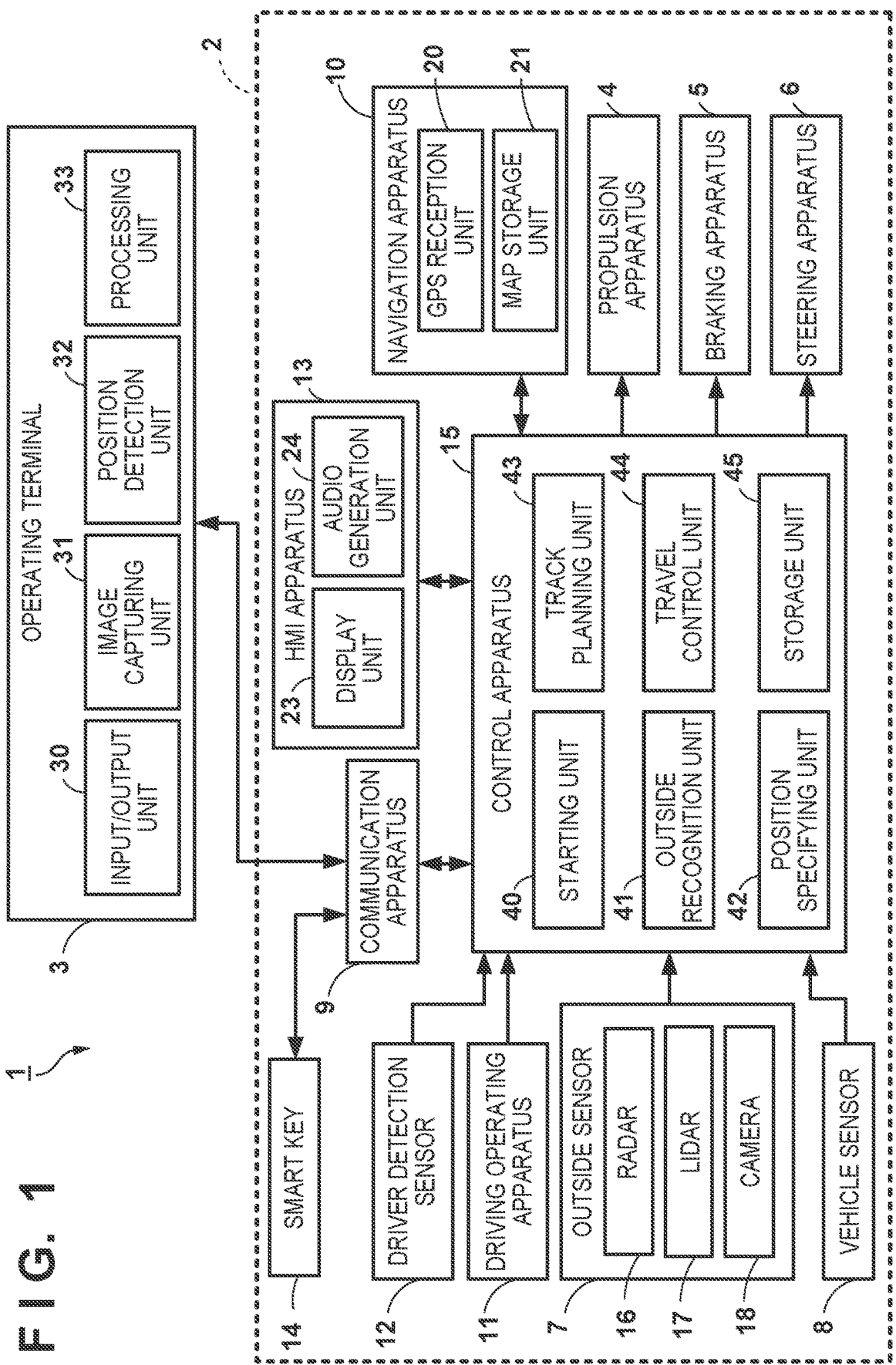
FIG. 1 is a block diagram illustrating the functional configuration of a vehicle control system according to an embodiment.

Hereinafter, embodiments will be described in detail with reference to the attached drawings. Note that the following embodiments are not intended to limit the scope of the claimed invention, and limitation is not made to an invention that requires all combinations of features described in the embodiments. Two or more of the multiple features described in the embodiments may be combined as appropriate. Furthermore, the same reference numerals are given to the same or similar configurations, and redundant description thereof is omitted.

Configuration of Vehicle Control System

FIG. 1 is a block diagram illustrating the functional configuration of a vehicle control system according to an embodiment. As illustrated in FIG. 1, a vehicle control system 1 includes a vehicle system 2 installed in a vehicle, and an operating terminal 3. The vehicle system 2 includes a propulsion apparatus 4, a braking apparatus 5, a steering apparatus 6, an outside sensor 7, a vehicle sensor 8, a communication apparatus 9, a navigation apparatus 10, a driving operating apparatus 11, a driver detection sensor 12, an interface apparatus (HMI apparatus) 13, a smart key 14, and a control apparatus 15. Each element of the vehicle system 2 is connected over an in-vehicle communication network such as a CAN (Controller Area Network) so as to be capable of transmitting signals.

The propulsion apparatus 4 is an apparatus that provides drive power to the vehicle, and includes, for example, a power source and a transmission. The power source includes at least one of an internal combustion engine, such as a gasoline engine or a diesel engine, and an electric motor. The braking apparatus 5 is an apparatus that imparts braking force on the vehicle, and includes, for example, a brake caliper that presses a pad against a brake rotor and an electric cylinder that supplies hydraulic pressure to the brake caliper. The braking apparatus 5 includes a parking brake apparatus that restricts the rotation of a wheel using a wire cable. The steering apparatus 6 is an apparatus for changing a steering angle of the wheels, and includes, for example, a rack-and-pinion mechanism that steers the wheels and an electric motor that drives the rack-and-pinion mechanism. The propulsion apparatus 4, the braking apparatus 5, and the steering apparatus 6 are controlled by the control apparatus 15.

The outside sensor 7 is a sensor that detects objects and the like in the periphery of the vehicle. The outside sensor 7 includes radar 16, LIDAR (Light Detection and Ranging) 17, and a camera 18, and outputs detection results to the control apparatus 15.

The radar 16 is, for example, millimeter wave radar, which can detect objects around the vehicle using radio waves, measure the distance to objects, and so on. A plurality of radars 16 are provided around the perimeter of the vehicle, e.g., one radar 16 is provided in the front-center of the vehicle, one at each front corner, and one at each rear corner.

The LIDAR 17 can detect objects around the vehicle using light, measure the distance to objects, and so on. A plurality of LIDARs 17 are provided around the perimeter of the vehicle, e.g., one LIDAR 17 is provided at each front corner of the vehicle, one in the rear-center, and one on each rear side.

The camera 18 is an apparatus for capturing images of the vehicle surroundings, and is, for example, a digital camera utilizing a solid-state image sensor such as a CCD or a CMOS. The camera 18 includes a front camera which captures images to the front of the vehicle and a rear camera which captures images to the rear of the vehicle. The camera 18 also includes a pair of left and right door mirror cameras which are provided near where door mirrors are installed on the vehicle and which capture images to the rear on the left and right sides of the vehicle.

The vehicle sensor 8 includes a vehicle speed sensor that detects the speed of the vehicle, an accelerometer that detects acceleration, a yaw rate sensor that detects angular velocity about a vertical axis, a directional sensor that detects which direction the vehicle is facing, and the like. The yaw rate sensor is a gyrosensor, for example.

The communication apparatus 9 relays wireless communication between the control apparatus 15 and the operating terminal 3. In other words, the control apparatus 15 can communicate with the operating terminal 3, which is in a user's possession, via the communication apparatus 9, using a communication method such as infrared communication or Bluetooth (registered trademark), for example.

The navigation apparatus 10 is an apparatus which obtains the current position of the vehicle, guides the vehicle along a route to a destination, and the like, and includes a GPS reception unit 20 and a map storage unit 21. The GPS reception unit 20 specifies the location of the vehicle (latitude and longitude) on the basis of signals received from an artificial satellite (a positioning satellite). The map storage unit 21 is constituted by a storage apparatus such as flash memory or a hard disk, and stores map information.

The driving operating apparatus 11 is provided in the vehicle cabin, and accepts input operations performed by the user for controlling the vehicle. The driving operating apparatus 11 includes, as driving operation units, a steering wheel, an accelerator pedal, a brake pedal, the parking brake apparatus, a shift lever, and a push-button start switch (an engine start button), for example. The push-button start switch accepts an input operation for starting the vehicle, through a driving operation from the user. The driving operating apparatus 11 includes a sensor that detects an operation amount, and outputs a signal indicating the operation amount to the control apparatus 15.

The driver detection sensor 12 is a sensor for detecting whether or not a person is seated in a driver's seat. The driver detection sensor 12 is, for example, a seating sensor provided in a seating surface of the driver's seat. The seating sensor may be an electrostatic capacitance-type sensor, or may be a membrane switch that turns on when a person sits in the driver's seat. The driver detection sensor 12 may also be an interior camera that captures an image of a user seated in the driver's seat. Furthermore, the driver detection sensor 12 may be a sensor that detects whether a person is seated in the driver's seat with their seatbelt fastened by obtaining an indication as to whether or not the buckle of the tongue of the driver's seat seatbelt is inserted. The driver detection sensor 12 outputs a detection result to the control apparatus 15.

The interface apparatus (HMI apparatus) 13 provides an interface (HMI; Human Machine Interface) between the control apparatus 15 and the user, communicates various types of information through displays and audio, and accepts input operations made by the user. The interface apparatus 13 includes: a display unit 23, which is constituted by a liquid crystal display, an organic EL display, or the like and functions as a touch panel capable of accepting input operations from the user; and an audio generation unit 24, which is a buzzer, a speaker, or the like.

The control apparatus 15 is an electronic control unit (ECU) including a CPU, non-volatile memory (ROM), and volatile memory (RAM). The control apparatus 15 can execute various types of vehicle control by the CPU executing arithmetic processing based on programs. At least some of the functional units of the control apparatus 15 may be implemented by hardware such as LS circuits, ASICs, or FPGAs, or may be implemented as a combination of software and hardware.

The smart key 14 (fob) is a wireless terminal that can be carried by the user, and is configured to be capable of communicating with the control apparatus 15 from outside the vehicle via the communication apparatus 9. The smart key 14 includes buttons for user input, and the user can lock a door (door lock), unlock the door (door unlock), start the vehicle, and so on by operating the buttons on the smart key 14.

The operating terminal 3 is a wireless terminal that can be earned by the user, and is capable of communicating with the control apparatus 15 from outside the vehicle via the communication apparatus 9. In the present embodiment, the operating terminal 3 is a portable information processing apparatus, such as a smartphone, for example. A predetermined application is installed in the operating terminal 3 in advance, which enables the operating terminal 3 to communicate with the control apparatus 15. Information capable of identifying the operating terminal 3 (e.g., a terminal ID including a predetermined numerical value or character string for identifying each operating terminal) is set in the operating terminal 3, and the control apparatus 15 can authenticate the operating terminal 3 on the basis of the terminal ID.

As illustrated in FIG. 1, the operating terminal 3 includes, as a functional configuration, an input/output unit 30, an image capturing unit 31, a position detection unit 32, and a processing unit 33.

The input/output unit 30 presents information to the user operating the operating terminal 3, and accepts inputs from the user operating the operating terminal 3. The input/output unit 30 functions as a touch panel, for example, and upon accepting an input from the user, the input/output unit 30 outputs a signal corresponding to the input to the processing unit 33.

The image capturing unit 31 is capable of shooting images (still images and moving images) according to an image capturing mode set from the input/output unit 30, and the image capturing unit 31 is a digital camera constituted by a CMOS sensor or the like, for example. The processing unit 33 can obtain features of an image by performing predetermined image processing on a captured image of the user operating the operating terminal 3, and can authenticate the user by comparing those features with features of a face image of the user which has been registered in advance.

The position detection unit 32 includes a sensor capable of obtaining position information of the operating terminal 3. The position detection unit 32 can obtain the position of the operating terminal 3 by receiving a signal from a geodetic satellite (a GPS satellite), for example. Furthermore, by communicating with the control apparatus 15 via the communication apparatus 9, the position detection unit 32 can obtain position information including the relative position of the operating terminal 3 with respect to the vehicle. The position detection unit 32 outputs the obtained position information to the processing unit 33.

The processing unit 33 transmits the terminal ID set in the operating terminal 3, signals from the input/output unit 30, the position information obtained by the position detection unit 32, and the like to the control apparatus 15. Additionally, upon receiving a signal from the control apparatus 15, the processing unit 33 processes the signal and causes the input/output unit 30 to present information to the user operating the operating terminal 3. The information is presented by making a display in the input/output unit 30, for example.

The control apparatus 15 can cause the vehicle to drive on the basis of signals from the operating terminal 3. The control apparatus 15 can also remotely perform control that causes the vehicle to move to a predetermined position, e.g., remote parking. To control the vehicle, the control apparatus 15 includes at least a starting unit 40, an outside recognition unit 41, a position specifying unit 42, a track planning unit 43, a travel control unit 44, and a storage unit 45.

The starting unit 40 authenticates the smart key 14 on the basis of a signal from the push-button start switch and determines whether the smart key 14 is inside the vehicle. When the smart key 14 has been authenticated and is inside the vehicle, the starting unit 40 starts driving the propulsion apparatus 4. Additionally, upon receiving a signal from the operating terminal 3 instructing startup, the starting unit 40 authenticates the operating terminal 3 and starts driving the vehicle once the authentication is successful. When starting the driving of the vehicle, if the propulsion apparatus 4 includes an internal combustion engine, the starting unit 40 turns on an ignition apparatus.

The outside recognition unit 41 recognizes, for example, obstacles such as parked vehicles and walls, people, and other objects present in the periphery of the vehicle on the basis of detection results from the outside sensor 7, and obtains information pertaining to the obstacles, people, and other objects, such as positions, sizes, and so on. The outside recognition unit 41 can analyze images obtained by the camera 18 on the basis of an image analysis method such as pattern matching and obtain whether or not obstacles, people, and other objects are present, the sizes thereof, and so on. Furthermore, the outside recognition unit 41 can calculate the distance to an obstacle, a person, or the like using signals from the radar 16 and the LIDAR 17, and obtain the position of the obstacle, person, or the like.

The position specifying unit 42 can detect the position of the vehicle on the basis of signals from the GPS reception unit 20 of the navigation apparatus 10. In addition to the signals from the GPS reception unit 20, the position specifying unit 42 can obtain the vehicle speed, yaw rate, and so on from the vehicle sensor 8 and specify the position and attitude of the vehicle using what is known as inertial navigation.

The outside recognition unit 41 can analyze the detection results of the outside sensor 7, and more specifically, the images captured by the camera 18, on the basis of an image analysis method such as pattern matching, and can obtain the position of white lines painted on a road surface, such as in a parking lot, for example.

The travel control unit 44 causes the vehicle to travel by controlling the propulsion apparatus 4, the braking apparatus 5, and the steering apparatus 6 to drive the vehicle on the basis of instructions for travel control from the track planning unit 43.

The storage unit 45 is constituted by RAM or the like, and stores information required for the processing performed by the track planning unit 43 and the travel control unit 44.

When the user makes an input in the HMI apparatus 13 or the operating terminal 3, the track planning unit 43 calculates a track to serve as a travel route of the vehicle and outputs travel control instructions to the travel control unit 44 as necessary.

After the vehicle has stopped, the track planning unit 43 performs parking assist processing when the user has made an input corresponding to a request for remotely-controlled parking assistance (remote parking assist).

When performing the parking assist processing, the track planning unit 43 first performs obtainment processing to obtain a possible parking position. The track planning unit 43 obtains the positions and sizes of obstacles and the positions of white lines painted on the road surface on the basis of signals from the outside sensor 7. Then, on the basis of the obtained positions and sizes of the obstacles and the white lines, the track planning unit 43 extracts a parking space where it is possible for the vehicle to park ("possible parking position" hereinafter).

Next, the track planning unit 43 performs parking position acceptance processing in which a parking position is accepted from possible parking positions. Once the track planning unit 43 has obtained at least one possible parking position, the track planning unit 43 causes a notification to be displayed in the display unit 23, instructing the user who is driving to stop the vehicle. At this time, the track planning unit 43 can instruct the user who is driving to stop the vehicle and then move the shift lever to a parking position.

The track planning unit 43 causes the current location of the vehicle and the possible parking position to be displayed in the display unit 23. At this time, the track planning unit 43 can also superimpose the images obtained by the camera 18 in the display unit 23. The track planning unit 43 then displays, in the display unit 23, a display prompting the user to select one position where the vehicle is to be parked (a parking position) from the possible parking positions. Once the user has input a desired parking position, the display unit 23 outputs, to the track planning unit 43, a signal corresponding to the input parking position.

At this time, the track planning unit 43 obtains the desired parking position from the user on the basis of a position touched by the user. The track planning unit 43 can display, in the display unit 23, a button for the user to select forward-facing parking or rearward-facing parking at this time. The track planning unit 43 can also calculate tracks from the current location of the vehicle to the parking position for both forward-facing parking and rearward-facing parking, and display the calculated tracks in the display unit 23. The display unit 23 allows the user to select forward-facing parking or rearward-facing parking by performing an operation of touching the track, and outputs the result of the selection to the track planning unit 43.

Next, upon receiving the parking position input by the user from the display unit 23, the track planning unit 43 performs track calculation processing, in which the track of the vehicle from the current location of the vehicle to the parking position is calculated. Upon accepting a user input operation pertaining to the selection of forward-facing parking and rearward-facing parking, the track planning unit 43 can calculate the track on the basis of the user's input, in addition to the current location of the vehicle and the parking position.

After the calculation of the track ends, the track planning unit 43 displays, in the display unit 23, a notification prompting the user to exit the vehicle, as well as a notification instructing the user to launch an application for remote parking in the operating terminal 3. In accordance with these notifications, the user exits the vehicle and launches the application in the operating terminal 3.

An input button for connecting to the vehicle is then displayed in the input/output unit 30 of the operating terminal 3. When the user touches the input button, the track planning unit 43 performs authentication processing in which the operating terminal 3 is authenticated using the terminal ID transmitted from the processing unit 33. Once the operating terminal 3 has been authenticated, the current location of the vehicle, the track, and the parking position are displayed, along with up and down arrows, in the input/output unit 30. The user can then instruct the track planning unit 43 to execute remote parking processing by making inputs in the operating terminal 3. The remote parking processing includes movement processing that causes the vehicle to move to the parking position and parking processing that causes the vehicle to park in the parking position.

When the user swipes the arrows displayed in the input/output unit 30 of the operating terminal 3, the operating terminal 3 transmits, to the track planning unit 43, an operation amount signal corresponding to the swipe amount. The track planning unit 43 converts the operation amount signal into a movement amount of the vehicle and performs the movement processing for causing the vehicle to move along the track by the calculated movement amount until the vehicle reaches the parking position.

In the movement processing, the track planning unit 43 determines whether the vehicle has reached the parking position, and upon determining that the vehicle has reached the parking position, performs the parking processing to cause the vehicle to park. In the parking processing, the track planning unit 43 first drives the braking apparatus 5 of the travel control unit 44. The track planning unit 43 then drives the parking brake of the travel control unit 44. Once the vehicle has come to a full stop, the track planning unit 43 transmits, to the operating terminal 3, a parking completion notification indicating that the parking is complete.

Upon receiving the parking completion notification, the operating terminal 3 causes a notification indicating that the parking is complete to be displayed in the input/output unit 30 of the operating terminal 3, and terminates the application in the operating terminal 3. This completes the parking assist processing.

Processing

Figure 2:
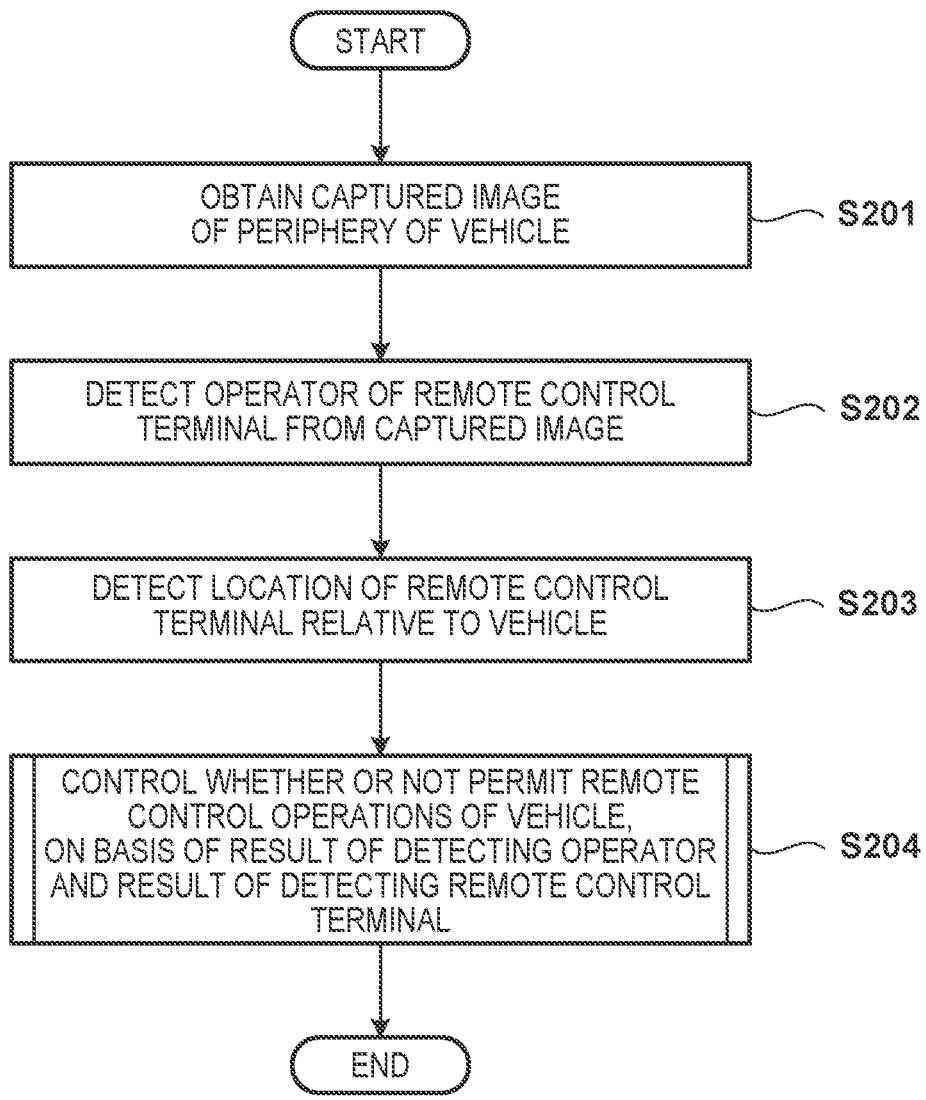
FIG. 2 is a flowchart illustrating an overall sequence of processing performed by a vehicle control apparatus according to an embodiment.
Figure 3:
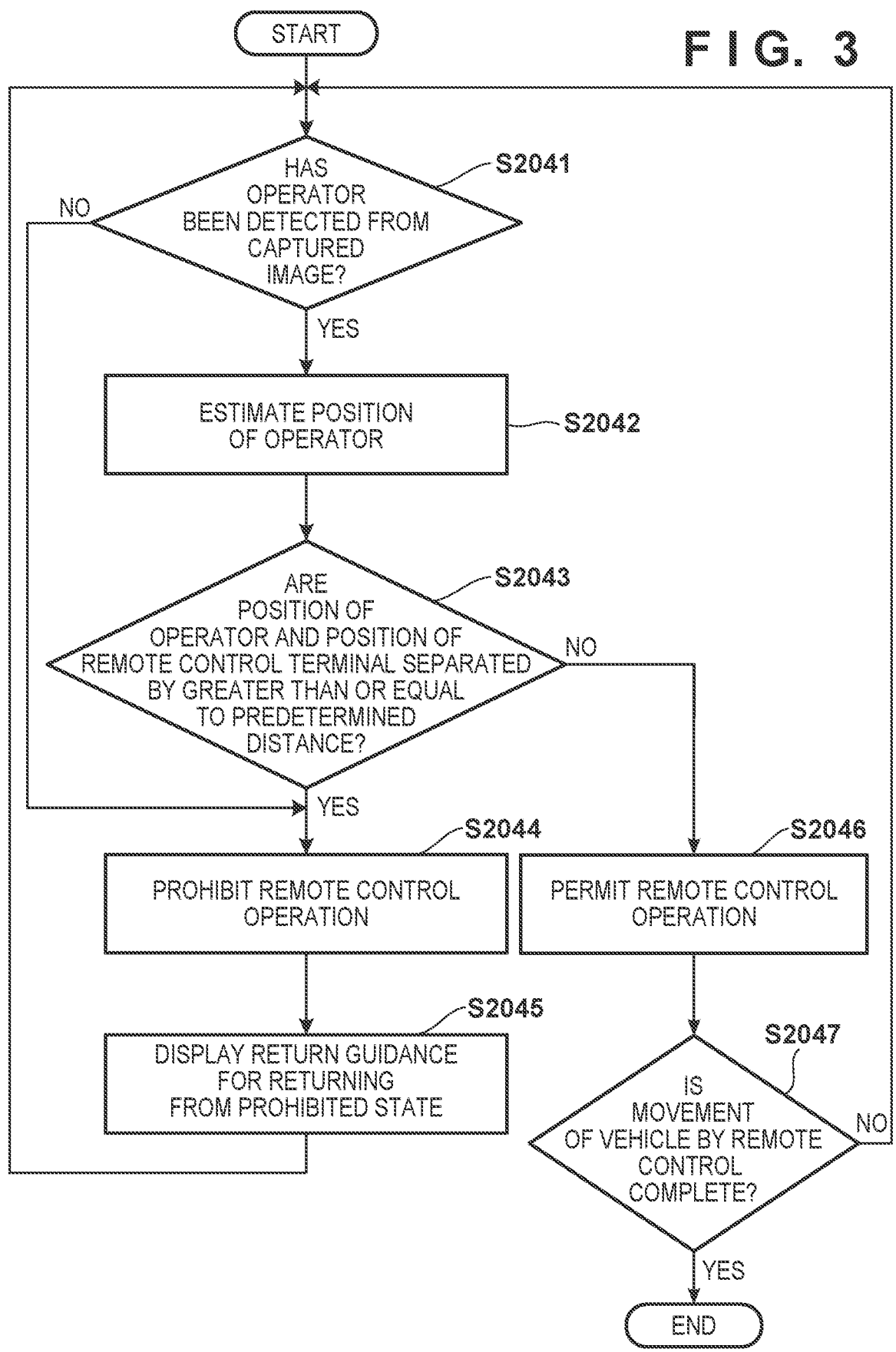
FIG. 3 is a flowchart illustrating, in detail, a sequence for determining whether or not to permit remote control operation according to an embodiment.

A processing sequence performed by the vehicle control apparatus (the control apparatus 15) according to the present embodiment will be described next with reference to the flowcharts in FIGS. 2 and 3. The present embodiment assumes a situation in which a user (operator) holding a remote control terminal (the operating terminal 3) exits the vehicle and executes automatic parking control remotely by, for example, operating the operating terminal 3 from a location distanced from the vehicle to send in instruction to move the vehicle. An overall processing sequence performed by the vehicle control apparatus according to the present embodiment will be described first with reference to the flowchart in FIG. 2.

In step S201, the control apparatus 15 of the vehicle system 2 obtains an image captured by the camera 18.

In step S202, the control apparatus 15 performs processing for detecting the operator of the operating terminal 3 from the captured image. The operator can be detected from the image through image recognition, for example.

In step S203, the control apparatus 15 detects the position of the operating terminal 3 relative to the vehicle. The control apparatus 15 can detect the position of the operating terminal 3 by receiving position information of the operating terminal 3 from the operating terminal 3, for example.

In step S204, the control apparatus 15 controls whether or not to permit remote control operations of the vehicle, on the basis of the result of detecting the operator and the result of detecting the operating terminal 3. The processing performed in step S204 will be described in detail later with reference to FIG. 3. This ends the processing illustrated in FIG. 2.

Note that in step S203, the control apparatus 15 may detect the position of the operating terminal 3 by receiving signals transmitted from the operating terminal 3 to a plurality of Bluetooth (registered trademark) antenna units disposed in the periphery of the vehicle and measuring the angles of arrival of the signals.

An example of a method for detecting the position of the operating terminal 3 using Bluetooth antenna units will be described here with reference to FIGS. 4 to 6B.

Figure 4:
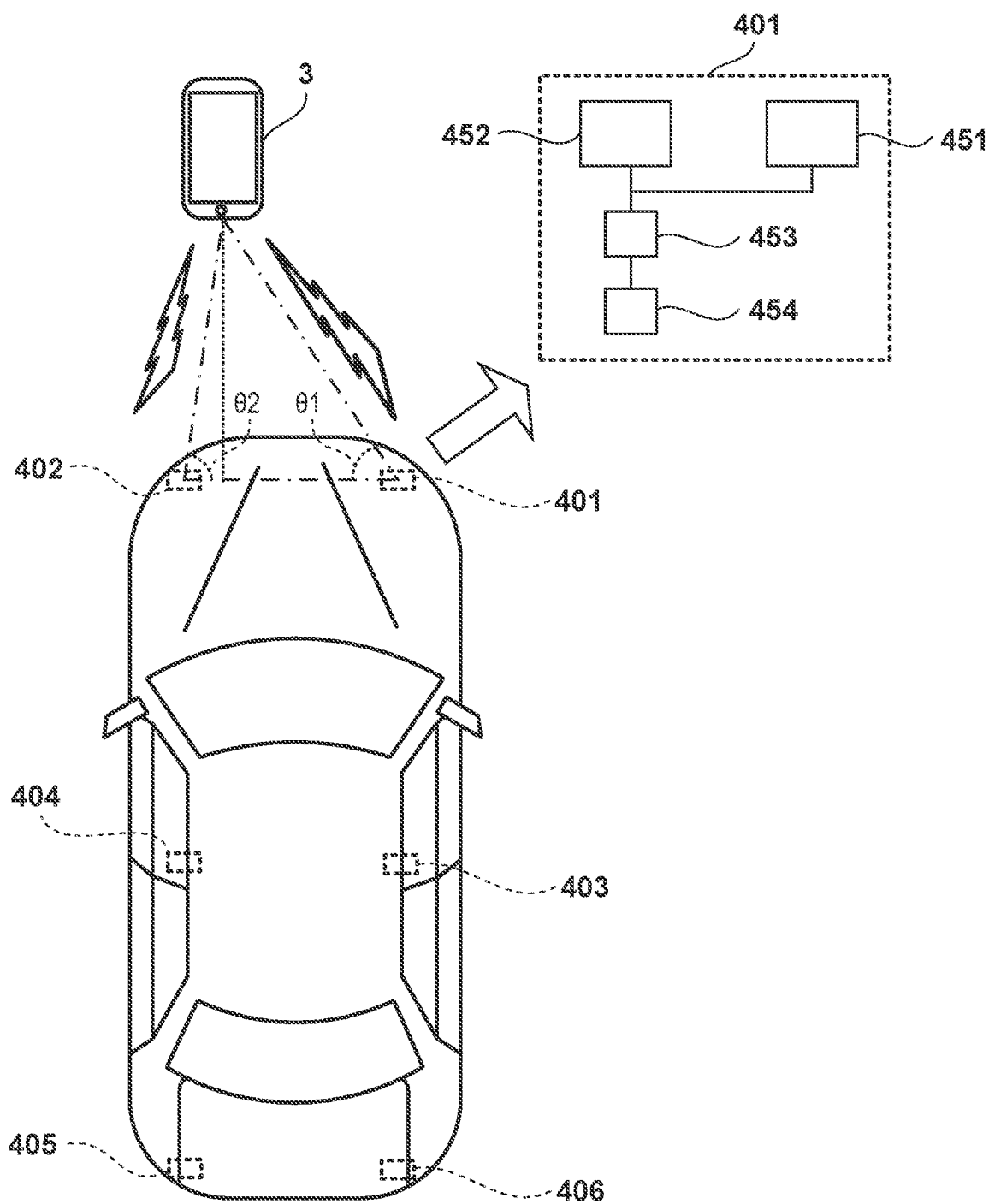
FIG. 4 is a diagram illustrating an example of a method for detecting a position of an operating terminal according to an embodiment.

As illustrated in FIG. 4, a plurality of Bluetooth antenna units 401 to 406 are disposed around (that is, in perimeter areas) of the vehicle. Note, however, that the number of Bluetooth antenna units is not limited to the example illustrated here. Each of the Bluetooth antenna units 401 to 406 includes a plurality of antennas 451 and 452, a Bluetooth communication IC 453, and a CPU 454 disposed on and incorporated into a circuit board.

The Bluetooth communication IC 453 measures a phase difference (voltage variation/time difference) when the signals transmitted from the operating terminal 3 are received by the antenna 451 and the antenna 452. The CPU 454 then calculates the angles of arrival of the signals on the basis of the phase difference (time difference). Information of the calculated angles of arrival is transmitted to the control apparatus 15 and aggregated. Because the distance between each Bluetooth antenna unit is known, the position (direction and distance) of the operating terminal 3 can be calculated using information on the angle of arrival calculated at each Bluetooth antenna unit (e.g., an angle of arrival $\theta 1$ to the Bluetooth antenna unit 401 and an angle of arrival $\theta 2$ to the Bluetooth antenna unit 402).

Figure 5A:
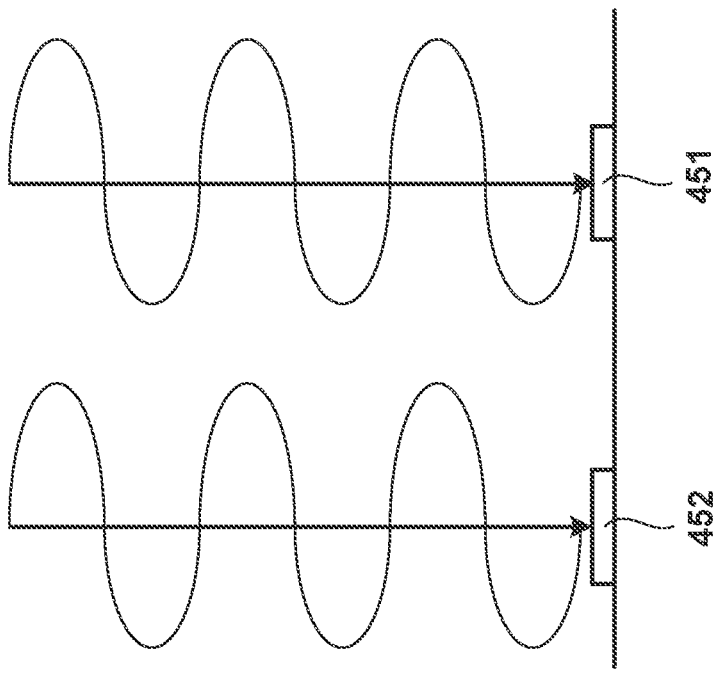
FIGS. 5A and 5B are diagrams illustrating an example of a method for detecting a position of an operating terminal according to an embodiment.
Figure 5B:
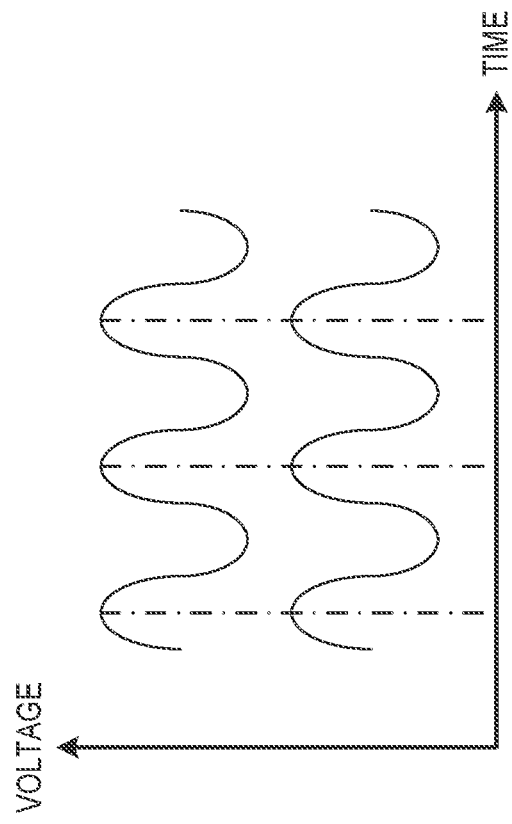

FIG. 5A is a diagram illustrating an example of a case where the operating terminal 3 is present in front of a Bluetooth antenna unit. As illustrated in FIG. 5B, when the operating terminal 3 is present in front of the Bluetooth antenna unit, there is substantially no phase difference between the signals received by the antennas 451 and 452 provided in the Bluetooth antenna unit. In other words, there is no time difference in the waveforms, and thus the angle of arrival can be calculated as being substantially 90 degrees.

On the other hand, FIG. 6A is a diagram illustrating an example of a case where the operating terminal 3 is present in a direction angled relative to a Bluetooth antenna unit (e.g., at 45 degrees). As illustrated in FIG. 6B, when the operating terminal 3 is present in a direction angled relative to the Bluetooth antenna unit, a phase difference 600 is detected between the signals received by the antennas 451 and 452 provided in the Bluetooth antenna unit. The angle of arrival can be calculated on the basis of this phase difference.

The sequence of the processing performed in step S204 of FIG. 2 will be described in detail next with reference to the flowchart in FIG. 3. In step S2041, the control apparatus 15 determines whether or not the operator has been detected from the captured image in step S202 of FIG. 2. The sequence moves to step S2042 if the operator has been detected. However, the sequence moves to step S2044 if the operator has not been detected.

In step S2042, the control apparatus 15 estimates the position of the operator by analyzing the captured image and by calculating the direction and distance at which the detected operator is present. For example, the distance to an object recognized as an operator can be calculated by obtaining a range image, and the direction can be calculated on the basis of the position of the operator in the image relative to the center of the image.

In step S2043, it is determined whether or not the position of the operator estimated in step S2042 and the position of the operating terminal 3 detected in step S203 are separated by greater than or equal to a predetermined distance. If the position of the operator and the position of the operating terminal 3 are separated by some distance, it can be determined that the operator is not holding the operating terminal 3 and may not be monitoring the vehicle. The sequence moves to step S2044 if it is determined that the positions are separated by greater than or equal to the predetermined distance. However, the sequence moves to step S2046 if it is determined that the positions are not separated by greater than or equal to the predetermined distance.

In step S2044, the control apparatus 15 prohibits remote control operations from being made through the operating terminal 3. For example, if a determination of "no" is made in step S2041, it is possible that the operator is not in a position where they can monitor the vehicle. Or, for example, the operator may be near the vehicle while holding the operating terminal 3, but there may be a pillar or the like between the operator and the vehicle and the operator may be hidden behind the pillar. As another scenario, even if the operator has been detected in the image, but the operator and the operating terminal 3 are in positions distanced from each other, the operator may not be monitoring the vehicle. The remote control operations are prohibited in such cases to ensure safety.

In step S2045, the control apparatus 15 transmits, to the operating terminal 3, information indicating a prohibited state in which the remote control operation is prohibited, and furthermore communicates, to the operating terminal 3, return guidance for returning from the prohibited state. The "return guidance" mentioned here is, for example, a message or voice such as "move to a position where you can monitor the vehicle", a message or voice such as "perform remote control while holding the operating terminal 3", or the like. The sequence then returns to step S2041. The operator takes action in accordance with the return guidance, and it is then determined again whether or not the remote control operations are to be permitted.

In step S2046, the control apparatus 15 permits remote control operations to be made through the operating terminal 3. In other words, the operator is considered to be monitoring the vehicle, and is therefore permitted to continue or resume the remote control operations.

In step S2047, the control apparatus 15 determines whether the movement of the vehicle performed through the operating terminal 3 (e.g., remote parking) is complete. If the movement is determined to be complete, the processing ends. However, if the movement is determined to be incomplete, the sequence returns to step S2041, and the series of processing is continued. Accordingly, the remote control operations can be temporarily prohibited if the user is neglecting to monitor the vehicle during remote control, which makes it possible to implement safer remote control of the vehicle.

As described above, according to the present embodiment, whether or not to permit remote control operations of the vehicle through the operating terminal is controlled having taken into account the result of detecting the operator and the result of detecting the remote control terminal. This makes it possible to suppress situations where remote control is performed under circumstances where the user may not be monitoring the vehicle. This in turn makes it possible to increase the safety of the remote control of the vehicle.

Variations

In the foregoing embodiment, the determination in step S2043 is made using the distance between the position of the operator and the position of the operating terminal 3. However, the configuration is not limited to this example. For example, the distance between the vehicle and the operator and the distance between the vehicle and the operating terminal 3 may be calculated separately; whether or not a difference between the distances is greater than or equal to a predetermined value may be determined; and if the difference between the distances is greater than or equal to a predetermined value, the remote control operations may be prohibited.

Additionally, although the foregoing embodiment describes an example in which the operator is detected using image recognition in step S2041, the configuration is not limited thereto. For example, the operating terminal 3 is caused to emit light in a predetermined light emission pattern using a light-emitting unit provided in the operating terminal 3. The control apparatus 15 then analyzes an image (a moving image) and detects the light emission in the predetermined light emission pattern. In this manner, the operator may be determined to have been detected when the predetermined light emission pattern has been detected.

The predetermined light emission pattern is, for example, a light emission pattern that flashes or lights up at a predetermined cycle. The light emission pattern can be generated by controlling the light-emitting unit to switch on and off. The operating terminal 3 being in the possession of a specific operator can be detected by detecting the predetermined light emission pattern. In such a case, the operating terminal 3 is detected in the captured image (moving image), and it can therefore be assumed that the person in possession of the operating terminal 3 is monitoring the vehicle. Note that in this case, the position of the operator and the position of the operating terminal 3 are substantially identical, and remote control is therefore permitted. When the predetermined light emission pattern is detected, return guidance implemented by a message or voice such as "point the light-emitting unit at the vehicle" may be provided as return guidance for after the remote control has been prohibited.

Additionally, rather than detecting the operator, a desired operating terminal 3 (i.e., an operating terminal that is emitting light in a predetermined light emission pattern) may be detected from the captured image (moving image), and the remote control operations may be controlled on the basis of a result of the detection. In other words, if an operating terminal 3 emitting light in a predetermined light emission pattern is detected, it may be determined that the operator in possession of that operating terminal is in a position where they can monitor the vehicle, and the remote control operations may be permitted. Conversely, if the operating terminal 3 emitting light in the predetermined light emission pattern is not detected (or is initially detected but then ceases to be detected partway through), it may be determined that the operator may not be monitoring the vehicle, and the remote control operations may be prohibited. The return guidance may then be displayed in the operating terminal 3, and the remote control operations may be permitted (or resumed) if the predetermined light emission pattern is detected as a result of the operator changing positions, pointing the light-emitting unit of the operating terminal at the vehicle, or the like. In this manner, by determining that the operator in possession of the operating terminal 3 is capable of monitoring the vehicle when the predetermined light emission pattern can be detected, the safety of the remote control of the vehicle can be improved without detecting the position of the operating terminal 3 itself.

Although the foregoing embodiment describes an example in which the position of the operator and the position of the operating terminal 3 are compared, the configuration is not limited thereto. For example, the direction in which the operator is present may be compared with the direction in which the operating terminal 3 is present, and if the directions are different by greater than or equal to a predetermined angle, it may be determined that the operator and the operating terminal 3 are far apart, i.e., that the operator may neglect to monitor the vehicle.

A program realizing one or more of the functions described in the embodiment can be supplied to a system or apparatus over a network or through a storage medium, and one or more processors in a computer of the system or apparatus can read out and execute the program. The present invention can be carried out in such a form as well.

According to the present invention, whether or not to permit remote control operations of a vehicle is controlled according to a state of detection of a remote control terminal, an operator, or the like, which makes it possible to prohibit and permit remote control operations of the vehicle according to those states. This in turn makes it possible to increase the safety of the remote control of the vehicle.

Summary of Embodiments

1. A vehicle control apparatus (e.g., 15) according to the foregoing embodiment is a vehicle control apparatus that controls movement of a vehicle in response to an instruction from a remote control terminal (e.g., 3) located outside the vehicle. The apparatus includes: an obtaining unit (e.g., 41, 44) configured to obtain an image captured by an image capturing unit (e.g., 18) that captures an image of a periphery of the vehicle; an operator detecting unit (e.g., 41, 44) configured to detect an operator of the remote control terminal on the basis of the image obtained by the obtaining unit; a terminal detecting unit (e.g., 44) configured to detect a position of the remote control terminal relative to the vehicle; and a control unit (e.g., 44) configured to control, on the basis of a detection result from the operator detecting unit and a detection result from the terminal detecting unit, whether to permit or prohibit a remote control operation of the vehicle performed through the remote control terminal.

According to this embodiment, whether or not to permit the remote control operation of the vehicle is controlled according to a state of detection of the remote control terminal, the operator, or the like, which makes it possible to prohibit and permit the remote control operation of the vehicle according to those states. Accordingly, situations where remote control is performed under circumstances where the remote control operation should not be performed can be suppressed.

2. In the vehicle control apparatus according to the foregoing embodiment, the control unit prohibits the remote control operation when the operator is not detected by the operator detecting unit.

According to this embodiment, the remote control operation is prohibited when the operator of the remote control terminal is not near the vehicle and may be neglecting to monitor the vehicle, which makes it possible to further improve safety.

3. The vehicle control apparatus according to the foregoing embodiment further includes a position estimating unit (e.g., 41, 44) configured to estimate, on the basis of the detection result from the operator detecting unit, a position where the operator detected from the image is present, and the control unit controls whether to permit or prohibit the remote control operation on the basis of the position of the operator estimated by the position estimating unit and the position of the remote control terminal detected by the terminal detecting unit.

According to this embodiment, whether to permit or prohibit the remote control operation can be controlled taking into account the position of the operator and the position of the remote control terminal.

4. In the vehicle control apparatus according to the foregoing embodiment, the control unit prohibits the remote control operation when the position of the operator and the position of the remote control terminal are separated by greater than or equal to a predetermined distance.

According to this embodiment, when the operator is distanced from the remote control terminal, the operator may be neglecting to monitor the vehicle, and thus by prohibiting the remote control operation in such a case, the safety can be further improved.

5. In the vehicle control apparatus according to the foregoing embodiment, the control unit calculates a distance from the vehicle to the operator and a distance from the vehicle to the remote control terminal, and prohibits the remote control operation when a difference between the distances is greater than or equal to a predetermined value.

According to this embodiment, when the operator is distanced from the remote control terminal, the operator may be neglecting to monitor the vehicle, and thus by prohibiting the remote control operation in such a case, the safety can be further improved.

6. In the vehicle control apparatus according to the foregoing embodiment, the operator detecting unit detects the operator in the image using image recognition.

According to this embodiment, whether or not a person in possession of the remote control terminal is in a position where that person can monitor the vehicle can be recognized on the basis of the detection result.

7. In the vehicle control apparatus according to the foregoing embodiment, the remote control terminal includes a light-emitting unit, and the operator detecting unit detects the operator by detecting, in the image, light emitted from the light-emitting unit of the remote control terminal.

According to this embodiment, even when the operator is present in a location far from the vehicle and it is therefore difficult to recognize the operator using image recognition, the presence of the operator in possession of the remote control terminal can be recognized.

8. In the vehicle control apparatus according to the foregoing embodiment, the control unit prohibits the remote control operation when light emitted in a predetermined light emission pattern is not detected.

According to this embodiment, when light emitted from a remote control terminal in the possession of another operator who remotely controls another vehicle is detected, a distinction can be made between the remote control terminal of the operator which is originally to be detected, and other remote control terminals. This makes it possible to prevent the erroneous execution of remote control based on an erroneous recognition.

9. In the vehicle control apparatus according to the foregoing embodiment, when the remote control operation has been prohibited, the control unit causes the remote control terminal to display return guidance for returning from a prohibited state.

According to this embodiment, the operator can be guided to enter a state in which the operator can monitor the vehicle.

10. In the vehicle control apparatus according to the foregoing embodiment, the remote control of the vehicle is remote parking control.

According to this embodiment, remote parking performed using a remote control terminal can be performed more safely.

11. A vehicle control apparatus according to the foregoing embodiment is a vehicle control apparatus (e.g., 15) that controls movement of a vehicle in response to an instruction from a remote control terminal (e.g., 3) located outside the vehicle. The apparatus includes: an obtaining unit (e.g., 41, 44) configured to obtain an image captured by an image capturing unit (e.g., 18) that captures an image of a periphery of the vehicle; a detecting unit (e.g., 41, 44) configured to detect the remote control terminal on the basis of the image obtained by the obtaining unit; and a control unit (e.g., 44) configured to control, on the basis of a detection result from the detecting unit, whether to permit or prohibit a remote control operation of the vehicle performed through the remote control terminal.

According to this embodiment, whether or not to permit the remote control operation of the vehicle is controlled according to a state of detection of the remote control terminal, which makes it possible to prohibit and permit the remote control operation of the vehicle according to that state. Accordingly, situations where remote control is performed under circumstances where the remote control operation should not be performed can be suppressed.

12. In the vehicle control apparatus according to the foregoing embodiment, the detecting unit prohibits the remote control operation when it is not detected that the remote control terminal is emitting light in a predetermined light emission pattern.

According to this embodiment, when light emitted from a remote control terminal in the possession of another operator who remotely controls another vehicle is detected, a distinction can be made between the remote control terminal of the operator which is originally to be detected, and other remote control terminals. This makes it possible to prevent the erroneous execution of remote control based on an erroneous recognition.

13. A vehicle according to the foregoing embodiment is a vehicle including the vehicle control apparatus (e.g., 15) according to the foregoing embodiment.

According to this embodiment, the processing performed by the vehicle control apparatus can be implemented in a vehicle.

14. An operation method of a vehicle control apparatus according to the foregoing embodiment is an operation method of a vehicle control apparatus (e.g., 15) that controls movement of a vehicle in response to an instruction from a remote control terminal (e.g., 3) located outside the vehicle. The method includes: obtaining an image captured by an image capturing unit (e.g., 18) that captures an image of a periphery of the vehicle (e.g., step S201); detecting an operator of the remote control terminal on the basis of the image obtained in the obtaining (e.g., step S202); detecting a position of the remote control terminal relative to the vehicle (e.g., step S203); and controlling, on the basis of a detection result from the detecting of the operator and a detection result from the detecting of the position, whether to permit or prohibit a remote control operation of the vehicle performed through the remote control terminal (e.g., step S204).

According to this embodiment, whether or not to permit the remote control operation of the vehicle is controlled according to a state of detection of the remote control terminal, the operator, or the like, which makes it possible to prohibit and permit the remote control operation of the vehicle according to those states. Accordingly, situations where remote control is performed under circumstances where the remote control operation should not be performed can be suppressed.

15. An operation method of a vehicle control apparatus according to the foregoing embodiment is an operation method of a vehicle control apparatus that controls movement of a vehicle in response to an instruction from a remote control terminal (e.g., 3) located outside the vehicle. The method includes: obtaining an image captured by an image capturing unit (e.g., 18) that captures an image of a periphery of the vehicle; detecting the remote control terminal on the basis of the image obtained in the obtaining; and controlling, on the basis of a detection result from the detecting, whether to permit or prohibit a remote control operation of the vehicle performed through the remote control terminal.

According to this embodiment, whether or not to permit the remote control operation of the vehicle is controlled according to a state of detection of the remote control terminal, which makes it possible to prohibit and permit the remote control operation of the vehicle according to that state. Accordingly, situations where remote control is performed under circumstances where the remote control operation should not be performed can be suppressed.

16. A storage medium according to the foregoing embodiment is a non-transitory computer-readable storage medium storing a program for causing a computer to function as the vehicle control apparatus (e.g., 15) according to the foregoing embodiment.

According to this embodiment, the present invention can be implemented by a computer.

The invention is not limited to the foregoing embodiments, and various variations/changes are possible within the spirit of the invention.

What is claimed is:

1. A vehicle control apparatus that controls movement of a vehicle in response to an instruction from a remote control terminal located outside the vehicle, the apparatus comprising:
one or more memories storing instructions; and
one or more processors executing the instructions to:
obtain an image captured by a camera configured to capture an image of a periphery of the vehicle;
detect an operator of the remote control terminal on the basis of the obtained image;

estimate, on the basis of a detection result of the operator, a position where the operator, detected from the image, is present, detect a position of the remote control terminal relative to the vehicle; and control, on the basis of a difference between i) a distance from the vehicle to the operator and ii) a distance from the vehicle to the remote control terminal, whether to permit or prohibit a remote control operation of the vehicle performed through the remote control terminal.

2. The vehicle control apparatus according to claim 1, wherein the control prohibits the remote control operation when the operator is not detected by the operator detecting unit.

3. The vehicle control apparatus according to claim 1, wherein the control prohibits the remote control operation when the position of the operator and the position of the remote control terminal are separated by greater than or equal to a predetermined distance.

4. The vehicle control apparatus according to claim 1, wherein the control prohibits the remote control operation when the difference is greater than or equal to a predetermined value.

5. The vehicle control apparatus according to claim 1, wherein the operator is detected in the image using image recognition.

6. The vehicle control apparatus according to claim 1, wherein the remote control terminal includes a light-emitting unit, and the operator is detected by detecting, in the image, light emitted from the light-emitting unit of the remote control terminal.

7. The vehicle control apparatus according to claim 6, wherein the control prohibits the remote control operation when light emitted in a predetermined light emission pattern is not detected.

8. The vehicle control apparatus according to claim 1, wherein when the remote control operation has been prohibited, the control causes the remote control terminal to display return guidance for returning from a prohibited state.

9. The vehicle control apparatus according to claim 1, wherein the remote control of the vehicle is remote parking control.

10. A vehicle comprising the vehicle control apparatus according to claim 1.

11. An operation method of a vehicle control apparatus that controls movement of a vehicle in response to an instruction from a remote control terminal located outside the vehicle, the method comprising:

obtaining an image captured by a camera configured to capture an image of a periphery of the vehicle;

detecting an operator of the remote control terminal on the basis of the obtained image;

estimating, on the basis of a detection result of the operator, a position where the operator, detected from the image, is present, detecting a position of the remote control terminal relative to the vehicle; and controlling, on the basis of a difference between i) a distance from the vehicle to the operator and ii) a distance from the vehicle to the remote control terminal, whether to permit or prohibit a remote control operation of the vehicle performed through the remote control terminal.

12. A non-transitory computer-readable storage medium in which is stored a program for causing a computer to execute each step of an operation method of a vehicle control apparatus that controls movement of a vehicle in response to an instruction from a remote control terminal located outside the vehicle, the method comprising:

obtaining an image captured by a camera configured to capture an image of a periphery of the vehicle;

detecting an operator of the remote control terminal on the basis of the obtained image;

estimating, on the basis of a detection result of the operator, a position where the operator, detected from the image, is present, detecting a position of the remote control terminal relative to the vehicle; and controlling, on the basis of a difference between i) a distance from the vehicle to the operator and ii) a distance from the vehicle to the remote control terminal, whether to permit or prohibit a remote control operation of the vehicle performed through the remote control terminal.

* * * * *